(12) United States Patent
Stevenson et al.

(10) Patent No.: US 10,126,485 B2
(45) Date of Patent: Nov. 13, 2018

(54) OPTICAL FILM AND LIGHTING AND DISPLAY PRODUCTS INCLUDING SAME

(71) Applicant: SAMSUNG ELECTRONICS CO., LTD., Suwon-si (KR)

(72) Inventors: Matthew Stevenson, Woburn, MA (US); John R. Linton, Concord, MA (US); Karthik Venkataraman, Arlington, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 352 days.

(21) Appl. No.: 14/718,771

(22) Filed: May 21, 2015

(65) Prior Publication Data
US 2015/0338567 A1    Nov. 26, 2015

Related U.S. Application Data

(60) Provisional application No. 62/001,625, filed on May 21, 2014.

(51) Int. Cl.
*G02B 6/00* (2006.01)
*F21V 8/00* (2006.01)
*B82Y 20/00* (2011.01)

(52) U.S. Cl.
CPC ........... *G02B 6/0051* (2013.01); *B82Y 20/00* (2013.01); *Y10S 977/774* (2013.01)

(58) Field of Classification Search
CPC .... G02B 5/02–5/0289; H04N 1/028–1/02891; B28Y 20/00
See application file for complete search history.

(56) References Cited

U.S. PATENT DOCUMENTS

| | | | |
|---|---|---|---|
| 5,831,774 A | 11/1998 | Toshima et al. | |
| 5,988,822 A | 11/1999 | Abe et al. | |
| 7,052,152 B2 | 5/2006 | Harbers et al. | |
| 7,255,469 B2 | 8/2007 | Wheatley et al. | |
| 7,481,562 B2 | 1/2009 | Chua et al. | |
| 7,535,642 B2 | 5/2009 | Toshima et al. | |
| 8,619,363 B1 * | 12/2013 | Coleman .................. | G02B 5/18 359/576 |
| 8,622,600 B2 | 1/2014 | Cheng et al. | |

(Continued)

OTHER PUBLICATIONS

Light Diffusion Film, Copyright 2009, pp. 1-6, Retrieved from the Internet May 8, 2014<URL:http://www.kimoto.co.jp/english/products/light.html>.

*Primary Examiner* — Bumsuk Won
*Assistant Examiner* — Jeffrey Madonna
(74) *Attorney, Agent, or Firm* — Cantor Colburn LLP

(57) ABSTRACT

An optical film includes a transparent substrate, an optical material comprising quantum dots disposed over a surface of the substrate, and a light diffusion film disposed over the optical material, the light diffusion film including a transparent support and a diffusion layer formed over the transparent support, the light diffusion film being positioned such that the transparent support is between the optical material and the diffusion layer, the light diffusion film having a back to front haze value of at least 80% and a total back to front light transmission value of at least 50%. Other layers can optionally be included in the optical film. A backlight unit and display including the optical film taught herein are also disclosed.

21 Claims, 8 Drawing Sheets

(56) References Cited

U.S. PATENT DOCUMENTS

| | | | |
|---|---|---|---|
| 8,647,727 B1* | 2/2014 | Barnidge | G02B 5/0242 |
| | | | 156/60 |
| 2004/0032546 A1* | 2/2004 | Ito | G02B 5/0226 |
| | | | 349/96 |
| 2006/0268537 A1 | 11/2006 | Kurihara et al. | |
| 2006/0290843 A1* | 12/2006 | Epstein | G02B 5/021 |
| | | | 349/113 |
| 2007/0121129 A1 | 5/2007 | Eida et al. | |
| 2007/0139781 A1* | 6/2007 | Inoue | G02B 5/0242 |
| | | | 359/599 |
| 2007/0201056 A1* | 8/2007 | Cok | B82Y 20/00 |
| | | | 358/1.9 |
| 2007/0253064 A1* | 11/2007 | Ookubo | G02B 5/0226 |
| | | | 359/599 |
| 2011/0128628 A1 | 6/2011 | Kuze et al. | |
| 2012/0154464 A1* | 6/2012 | Ninan | G02B 27/2264 |
| | | | 345/691 |
| 2013/0033891 A1 | 2/2013 | Cheng et al. | |
| 2013/0115441 A1 | 5/2013 | Bookbinder et al. | |
| 2013/0200415 A1 | 8/2013 | Evans et al. | |
| 2014/0007940 A1 | 1/2014 | Wu et al. | |
| 2014/0119049 A1 | 5/2014 | Kim et al. | |
| 2015/0301257 A1* | 10/2015 | Choi | C09K 11/025 |
| | | | 362/607 |

\* cited by examiner

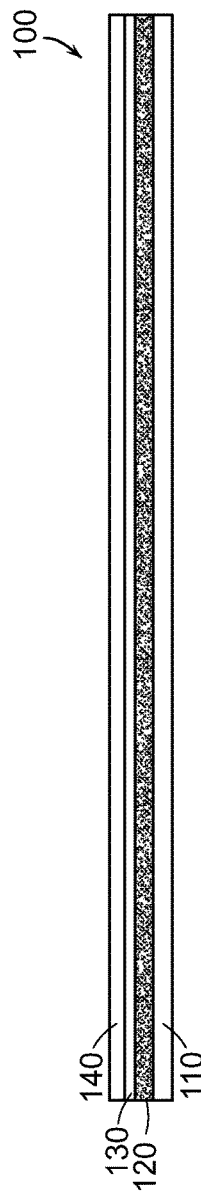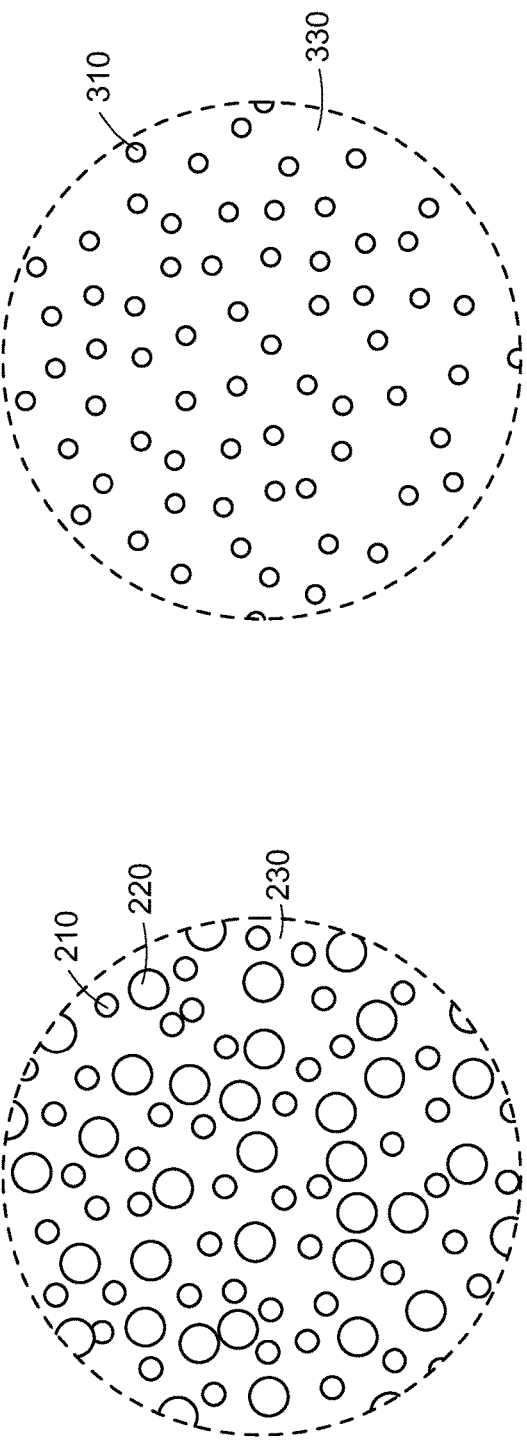

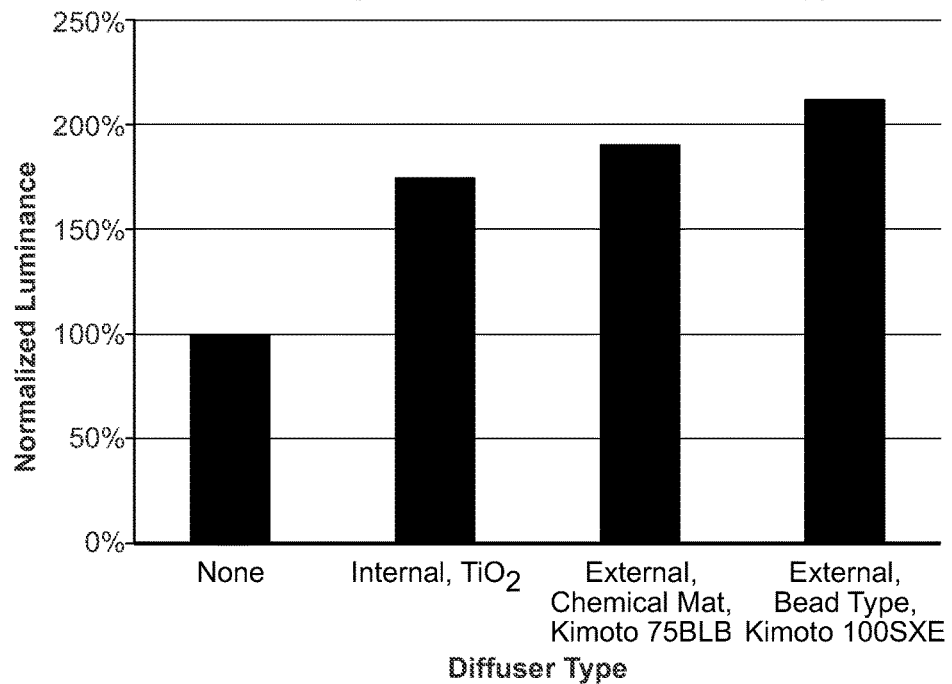
FIG. 4 Normalized Luminance for Examples of Optical Films Including IF169a1 and Different Diffuser Types
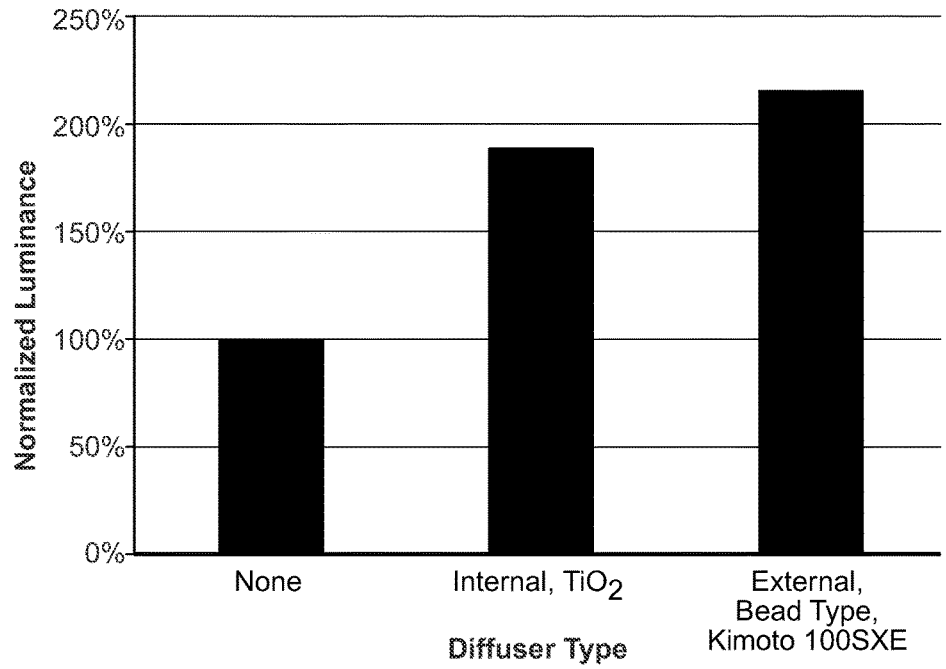
FIG. 5 Normalized Luminance for Examples of Optical Films Including IF252a or IF252b and Different Diffuser Types

OPTICAL FILM AND LIGHTING AND DISPLAY PRODUCTS INCLUDING SAME

This application claims priority to U.S. Provisional Patent Application No. 62/001,625, filed 21 May 2014, which is hereby incorporated herein by reference in its entirety for all purposes.

TECHNICAL FIELD OF THE INVENTION

The present invention relates to the field of optical films and uses thereof, and more particularly to optical films including quantum dots and lighting and display products that include such optical films.

SUMMARY OF THE INVENTION

The present invention relates to an optical film including quantum dots, backlight units including an optical film including quantum dots, and displays including an optical film including quantum dots.

In accordance with one aspect of the present invention there is provided an optical film including a transparent substrate, an optical material comprising quantum dots disposed over a surface of the substrate, and a light diffusion film disposed over the optical material, the light diffusion film including a transparent support and a diffusion layer formed over the transparent support, the light diffusion film being positioned such that the transparent support is between the optical material and the diffusion layer, the light diffusion film having a back to front haze value of at least 80% and a total back to front light transmission value of at least 50%.

It has been surprisingly found that an optical film in accordance with the present invention can achieve a higher lumen output compared to an optical film having a similar transparent substrate and an optical material including quantum dots, light scattering particles, and a host material, but that does not include a light diffusion film as taught herein.

A light diffusion film can comprise a diffusion layer having a surface with a roughened or matte finish or a surface including outcoupling features (e.g., but not limited to, microspheres, a microlens array, prisms, etc.). Such surface is preferably positioned to be the light emitting surface of the diffusion layer.

Preferred embodiments include, but are not limited to, a light diffusion film comprising a diffusion layer having a roughened or matte finish and a back to front haze value of at least 90% and a back to front light transmission value of at least 50%, and a light diffusion film comprising a diffusion layer including light diffusing particles and a resin, the light diffusion film having a back to front haze value of at last 90% and a back to front light transmission value of at least 80%.

In accordance with another aspect of the present invention there is provided a backlight unit including a light guide plate including an optical film taught herein disposed over a first surface of the light guide, and a light source unit including one or more light sources, the optical film or a surface of the light guide plate other than the first surface being positioned to receive light emitted by the light source unit, wherein the one or more light sources emit light of a first wavelength and the quantum dots included in the optical material are selected to convert light of the first wavelength to one or more preselected wavelengths.

In accordance with another aspect of the present invention there is provided a display system comprising a display panel and a backlight unit taught herein configured to provide light to the display panel.

The foregoing, and other aspects described herein, all constitute embodiments of the present invention.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed.

Other embodiments will be apparent to those skilled in the art from consideration of the description and drawings, from the claims, and from practice of the invention disclosed herein.

BRIEF DESCRIPTION OF THE DRAWINGS

In the drawings,

FIG. 1 depicts a cross-sectional view of an example of an embodiment of an optical film in accordance with one aspect of the invention.

FIG. 2 is a graphic representation depicting an enlarged plan view of a portion of an example of a light diffusion sheet included in an optical film in accordance with one aspect of the invention.

FIG. 3 is a graphic representation depicting an enlarged plan view of a portion of an example of a light diffusion sheet included in an optical film in accordance with one aspect of the invention.

FIG. 4 and FIG. 5 graphically depict test data of normalized luminance data measured from certain test optical films described in the Examples, which test optical films include different diffuser types and a test optical film including no diffuser component.

Figures 6A, 6B:
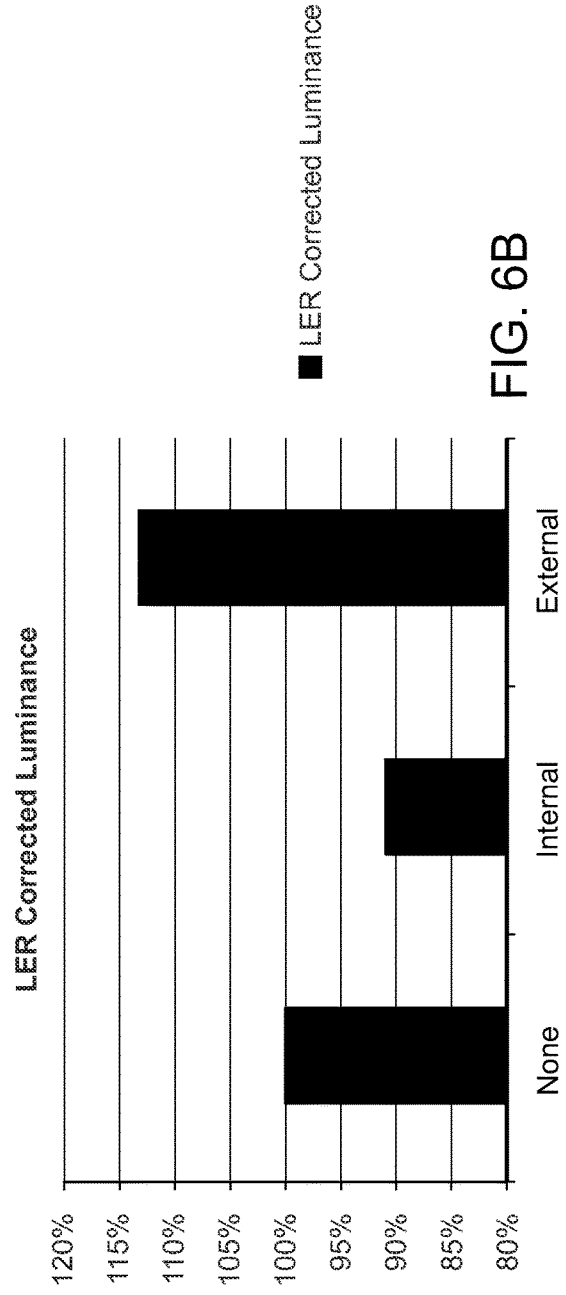
FIG. 6A presents Luminous Efficacy of Radiation (LER) corrected data corresponding to the FIG. 5 test optical film samples.
FIG. 6B depicts a graphical representation of the corrected luminance data presented in FIG. 6A.

The attached figures are simplified representations presented for purposes of illustration only; the actual structures may differ in numerous respects, particularly including the relative scale of the articles depicted and aspects thereof.

For a better understanding to the present invention, together with other advantages and capabilities thereof, reference is made to the following disclosure and appended claims in connection with the above-described drawings.

DETAILED DESCRIPTION OF THE INVENTION

Various aspects and embodiments of the present inventions will be further described in the following detailed description.

In accordance with one aspect of the present invention there is provided an optical film including a transparent substrate, an optical material comprising quantum dots disposed over a surface of the substrate, and a light diffusion film disposed over the optical material, the light diffusion film including a transparent support and a diffusion layer formed over the transparent support, the light diffusion film being positioned such that the transparent support is between the optical material and the diffusion layer, the light diffusion film having a back to front haze value of at least 80% and a total back to front light transmission value of at least 50%.

FIG. 1 depicts a cross-sectional view of an example of an embodiment of an optical film in accordance with one aspect of the invention.

Referring to FIG. 1, the depicted example of an optical film 100 includes a transparent substrate 110, a layer including an optical material comprising quantum dots 120, a coupling layer 130, and a light diffusion film 140.

A transparent substrate 110 can be rigid or flexible. Examples of rigid substrate materials include, but are not limited to, glasses, polycarbonates, acrylics, quartz, sapphire, and other rigid transparent materials. Examples of flexible materials include, but are not limited to, polymeric materials such as plastic (e.g. but not limited to thin acrylic, epoxy, polycarbonate, PEN, PET, PE), resins, silicones, and other flexible transparent materials.

A transparent substrate can also comprise a flexible material that further includes a silica or glass coating thereon. Preferably the silica or glass coating is sufficiently thin to retain the flexible nature of the base flexible material.

Examples of a transparent substrate include, but are not limited to, substrates that are at least 80% optically transparent to one or more preselected wavelengths of light, at least 85% optically transparent to one or more preselected wavelengths of light, at least 90% optically transparent to one or more preselected wavelengths of light, at least 95% optically transparent to one or more preselected wavelengths of light, at least 99% optically transparent to one or more preselected wavelengths of light. Depending on the particular intended end-use for the optical film, an optical transparency less than 80% can be useful or desirable.

Preferably the transparent substrate has oxygen barrier properties.

More preferably the transparent substrate has oxygen and moisture barrier properties.

In the example depicted in FIG. 1, the optical material 120 is disposed over the transparent substrate as a layer of optical material. The optical material can be disposed directly on the transparent substrate. Optionally, additional layers or features can be included between the optical material and the transparent substrate.

An optical material can be disposed as one or more layers. When more than one layer of optical material is included in the optical film, the optical material in each layer can be the same as or different from the optical material included in another layer.

A layer of optical material can be patterned or unpatterned. Such feature is selected based on the intended end-use application of the optical film.

As mentioned above, an optical material comprises quantum dots. An optical material can further comprise a mixture of two or more optical materials.

Quantum dots can confine electrons and holes and have a photoluminescent property to absorb light and re-emit different wavelength light. Color characteristics of emitted light from quantum dots depend on the size of the quantum dots and the chemical composition of the quantum dots.

Quantum dots include at least one type of quantum dot with respect to chemical composition, structure, and size. The type(s) of quantum dots included in an optical film in accordance with the invention are determined by the wavelength of light to be converted and the wavelengths of the desired light output. As discussed herein, quantum dots may or may not include a shell and/or a ligand on a surface thereof. In certain embodiments, a shell and/or ligand can passivate quantum dots to prevent agglomeration or aggregation to overcome the Van der Waals binding force between the quantum dots. In certain embodiments, the ligand can comprise a material having an affinity for any host material in which a quantum dot may be included. As discussed herein, a shell can comprise an inorganic shell.

Quantum dots included in an optical material can be cadmium free.

Quantum dots included in an optical material can include cadmium.

Quantum dots included in an optical material can comprise a semiconductor nanocrystal including a core comprising a semiconductor material and an inorganic shell disposed on at least a portion of a surface of the core.

Nonlimiting examples of quantum dots that can be included in an optical material are described below.

A quantum dot may also be referred to herein by the abbreviation "QD".

An optical material can include one or more different types of quantum dots (based on composition, structure and/or size), wherein each type is selected to obtain light having a preselected color.

For example, an optical material can comprise quantum dots capable of emitting light in one or more of: the orange to red spectral (e.g., from about 575 nm to about 650 nm) region, in the red spectral region, in the orange spectral region, in the cyan spectral region, in the green spectral region, in the blue spectral region.

Preferably the quantum dots included in an optical material have a solution quantum yield, prior to inclusion in an optical material, of at least about 60%, more preferably at least about 75%, and most preferably at least about 85%. Depending on the particular intended end-use for the optical film, quantum dots with other solution quantum yields can be useful or desirable for inclusion in an optical material.

An optical film in accordance with the invention includes an optical material comprising one or more different types of quantum dots (based on composition, structure and/or size or the quantum dot). When more than one type of quantum dot is included, each different type of quantum dots can be selected to emit light at preselected wavelength that can be the same as or different from the preselected wavelength emitted by that emitted by another type of quantum dots included in an optical material. The preselected wavelengths are typically selected based on the intended end-use application for an optical film.

When it is desirable to utilize two or more different types of quantum dots that emit at different preselected wavelengths, the different types of quantum dots can be included in one or more different optical materials. When two or more different optical materials are included in an optical film, such different optical materials can, for example, be included as separate layers of a layered arrangement and/or as separate features of a patterned layer. Other configurations may be determined to be useful or desirable.

In certain embodiments, for example, the preselected wavelength can be in a range from about 470 nm to about 650 nm, from about 580 nm to about 630 nm, from about 590 nm to about 630 nm, from about 590 nm to about 630 nm, or from about 600 nm to about 620 nm, from about 600 to about 610, or from about 608 to about 618. Other preselected wavelengths may also be determined to be useful or desirable.

Preferably the quantum dots in an optical material have a solid state photoluminescent quantum efficiency of at least 40%, including for example, but not limited to, at least 50%, at least 60%, at least 70%, at least 80%, at least 90%, etc. Quantum dots in an optical material having other solid state photoluminescent quantum efficiencies may also be determined to be useful or desirable.

In certain embodiments, an optical material comprises quantum dots capable of emitting red light. In other certain embodiments, an optical material comprises quantum dots capable of emitting light in the orange to red spectral region. In other certain embodiments, an optical material comprises quantum dots capable of emitting light in the green spectral region. In other embodiments, an optical material can comprise quantum dots capable of emitting red light and quantum dots capable of emitting green light.

An optical material can further comprise a host material.

When an optical material further comprises a host material, the quantum dots can be included in the optical material, for example, in an amount in a range from about 0.001 to about 15 weight percent of the weight of the host material, e.g., but not limited to, in a range from about 0.001 to about 10 weight percent of the weight of the host material, in a range from about 0.001 to about 5 weight percent of the weight of the host material, in a range from about 0.001 to about 3 weight percent of the weight of the host material, in a range from about 0.01 to about 15 weight percent of the weight of the host material, in a range from about 0.01 to about 10 weight percent of the weight of the host material, in a range from about 0.01 to about 5 weight percent of the weight of the host material, in a range from about 0.01 to about 3 weight percent of the weight of the host material, in a range from about 0.1 to about 3 weight percent quantum dots based on the weight of the host material, etc.

When an optical material further comprises a host material, the quantum dots can be included in the optical material, for example, in an amount greater than about 5 weight percent of the host material. Such examples include, but are not limited to, in a range from about 5 to about 20 weight percent quantum dots based on the weight of the host material; in a range from about 5 to about 15 weight percent quantum dots based on the weight of the host material, in a range from about 5 to about 10 weight percent quantum dots based on the weight of the host material, etc.

Other concentrations of quantum dots in an optical material further comprising a host material that are either within our outside of the above examples of ranges may also be determined to be useful or desirable.

Preferably, the host material comprises a solid host material. Examples of a host material useful in various embodiments and aspect of the inventions described herein include polymers, monomers, resins, binders, glasses, metal oxides, and other nonpolymeric materials. Preferred host materials include materials that are optically transparent to one or more preselected wavelengths of light. Such preselected wavelengths can selected based on, for example, the wavelength(s) of light emitted by one or more light sources, the wavelength(s) of light emitted by quantum dots included in the optical material, and other wavelengths of light intended to pass through the optical material based on the intended end-use application of the optical film.

Examples of a transparent host material include, but are not limited to, host materials that are at least 80% optically transparent to one or more preselected wavelengths of light. In certain embodiments, a host material is at least 90% optically transparent to one or more preselected wavelengths of light. In certain embodiments, a host material is at least 95% optically transparent to one or more preselected wavelengths of light. In certain embodiments, a host material is at least 99% optically transparent to one or more preselected wavelengths of light. Depending on the particular intended end-use for the optical film, a host material with an optical transparency less than 80% can be useful or desirable.

In certain embodiments, one or more preselected wavelengths can include wavelengths of light in the visible (e.g., 400-700 nm) region of the electromagnetic spectrum.

Other examples of host materials include, but are not limited to, cross-linked polymers, solvent-cast polymers, glasses, and resins that are optically transparent to one or more preselected wavelengths of light. In particular, a resin such as a non-curable resin, heat-curable resin, or photocurable resin is suitably used from the viewpoint of processability. As specific examples of such a resin, in the form of either an oligomer or a polymer, a melamine resin, a phenol resin, an alkyl resin, an epoxy resin, a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers forming these resins, and the like. Other suitable host materials can be identified by persons of ordinary skill in the relevant art.

As mentioned above, a host material can comprise a photocurable resin. A photocurable resin may be a preferred host material in certain embodiments, e.g., embodiments in which the composition is to be patterned. As a photo-curable resin, a photo-polymerizable resin such as an acrylic acid or methacrylic acid based resin containing a reactive vinyl group, a photo-crosslinkable resin which generally contains a photo-sensitizer, such as polyvinyl cinnamate, benzophenone, or the like may be used. A heat-curable resin may be used when the photo-sensitizer is not used. These resins may be used individually or in combination of two or more.

As also mentioned above, a host material can comprise a solvent-cast resin. A polymer such as a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers forming these resins, and the like can be dissolved in solvents known to those skilled in the art. Upon evaporation of the solvent, the resin forms a solid host material for the quantum dots.

Preferably a host material does not yellow or discolor during the useful lifetime of the optical film so as to substantially alter the optical properties of the optical film.

An optical material can further comprise one or more additional components. Examples of such additional components include, but are not limited to, a UV absorber, a dispersant, leveling agent, viscosity modifiers, colorants (e.g., dyes), phosphor particles, humectants, fillers, extenders, etc., and mixtures thereof.

An optical material can optionally further include scatterers. In certain embodiments, the scatterers are also included in the optical material in amount in the range from about 0.001 to about 15 weight percent based on the weight of the host material e.g., but not limited to, in a range from about 0.001 to about 10 weight percent of the weight of the host material, in a range from about 0.001 to about 5 weight percent of the weight of the host material, in a range from about 0.001 to about 3 weight percent of the weight of the host material, in a range from about 0.01 to about 15 weight percent of the weight of the host material, in a range from about 0.01 to about 10 weight percent of the weight of the host material, in a range from about 0.01 to about 5 weight percent of the weight of the host material, in a range from about 0.01 to about 3 weight percent of the weight of the host material, in a range from about 0.1 to about 3 weight percent quantum dots based on the weight of the host material, etc. In certain embodiments, the weight ratio of quantum dots to scatterers is from about 1:100 to about 100:1.

Examples of scatterers (also referred to herein as light scattering particles) include, without limitation, metal or metal oxide particles, air bubbles, and glass and polymeric beads (solid or hollow). Other scatterers can be readily identified by those of ordinary skill in the art. In certain embodiments, scatterers have a spherical shape. Preferred examples of scattering particles include, but are not limited to, $TiO_2$, $SiO_2$, $BaTiO_3$, $BaSO_4$, and ZnO. Particles of other materials that are non-reactive with the host material and that can increase the absorption pathlength of the excitation light in the host material can be used. Additionally, scatterers that aid in the out-coupling of the down-converted light may be used. These may or may not be the same scatterers used for increasing the absorption pathlength. In certain embodiments, the scatterers may have a high index of refraction (e.g., $TiO_2$, $BaSO_4$, etc) or a low index of refraction (gas bubbles). Preferably the scatterers are not luminescent.

Selection of the size and size distribution of the scatterers is readily determinable by those of ordinary skill in the art. The size and size distribution is preferably based upon the refractive index mismatch of the scattering particle and the host material in which it the scatterer is to be dispersed, and the preselected wavelength(s) to be scattered according to Rayleigh scattering theory. The surface of the scattering particle may further be treated to improve dispersability and stability in the host material. In one embodiment, the scattering particle comprises $TiO_2$ (R902+ from DuPont) of 0.2 μm particle size, in a concentration in a range from about 0.001 to about 20% by weight.

An optical material can further optionally include an emission stabilizer, as described in International Publication No. WO 2013/078252 A1, published 30 May 2013, of QD Vision, Inc., entitled "Quantum Dot-Containing Compositions Including An Emission Stabilizer, Products Including Same, And Method", which is hereby incorporated herein by reference in its entirety.

An optical material can optionally further include a second transparent substrate disposed thereover such that the optical material is sandwiched between transparent substrates, with the light diffusion film being disposed over one of the substrates. The second transparent substrate can comprise, for example, a transparent substrate described herein. As discussed below, a coupling layer can optionally be included between the light diffusion film and underlying layer of the optical film to secure the light diffusion film thereto.

The example of the optical film depicted in FIG. 1 includes a coupling layer 130, the inclusion of which can be preferred, but optional.

Inclusion of a coupling layer between the optical material and light diffusion film can prevent separation of the optical material and light diffusion film during handling and/or use of the optical film.

A coupling layer comprises a coupling material that is preferably chosen for its optical transmission properties and its adhesion qualities.

A coupling layer is preferably optically transparent to one or more preselected wavelengths of light intended to pass therethrough in the end-use application of the optical film.

A coupling layer also preferably has adequate adhesive properties to seal the light diffusion film to the underlying portion of the optical film. More preferably, the seal will not partially or fully delaminate or otherwise fail during the useful lifetime of the optical film.

A coupling layer preferably comprises a coupling material that can be hardened (e.g., cured or dried) or formed into a layer under conditions that are not detrimental to an optical material and the external quantum efficiency of an optical material. Preferably a coupling material can be UV cured.

In certain embodiments, a coupling material can comprise a pressure sensitive adhesive.

A coupling layer is preferably substantially free, and more preferably free, of air bubbles observable by the naked eye.

Examples of an optically transparent coupling material for inclusion in a coupling layer include, but are not limited to, coupling materials that are at least 80% optically transparent to one or more preselected wavelengths of light. In certain embodiments, a coupling material is at least 90% optically transparent to one or more preselected wavelengths of light. In certain embodiments, a coupling material is at least 95% optically transparent to one or more preselected wavelengths of light. In certain embodiments, a coupling material is at least 99% optically transparent to one or more preselected wavelengths of light. Depending on the particular intended end-use for the optical film, a coupling material with an optical transparency less than 80% can be useful or desirable.

Preferably a coupling layer does not yellow or discolor during the useful lifetime of the optical film so as to substantially alter the optical properties of the optical film.

Examples of preferred coupling materials for use in preparing a coupling layer include, but are not limited to, an index-matching gel and an optically clear adhesive.

Examples of coupling materials include, but are not limited to, UV curable acrylic urethanes include products sold by Norland Adhesives called Norland Optical Adhesive 68 and Norland Optical Adhesive 68 T.

Other coupling materials can be identified by one of ordinary skill in the relevant art.

As depicted in FIG. 1, a light diffusion film 140 is disposed over the coupling layer. (If a coupling layer is not included in an optical film, the light diffusion film is disposed over the optical material.)

As mentioned above, a light diffusion film includes a transparent support and a diffusion layer formed over the transparent support, the light diffusion film being positioned such that the transparent support is between the optical material and the diffusion layer, the light diffusion film having a back to front haze value of at least 80% and a total back to front light transmission value of at least 50%.

A light diffusion film can preferably comprise a diffusion layer having a surface with a roughened or matte finish or a surface including outcoupling features (e.g., but not limited to, microspheres, a microlens array, prisms, etc.). Such surface is preferably positioned to be the light emitting surface of the diffusion layer.

In an example of a preferred embodiment, a light diffusion film can comprise a diffusion layer having a roughened or matte finish and a back to front haze value of at least 90% and a back to front light transmission value of at least 50%.

In another example of a preferred embodiment, a light diffusion film can comprise a diffusion layer including light diffusing particles and a resin, the light diffusion film having a back to front haze value of at last 90% and a back to front light transmission value of at least 80%. In such embodiments, the light diffusing particles can include light scattering particles of a single average particle size (representing a monodisperse population of light scattering particles) or a mixture of light diffusing particles of two or more different average particle sizes (such mixture representing a polydisperse population of light scattering particles).

The light diffusion film is preferably positioned such that the diffusion layer side of the light diffusion film is the light-emitting side of the light diffusion film at the light-emitting side of the optical film.

FIG. 2 depicts a schematic of a plan view of a portion of a surface of an example of an optical film, the depicted surface comprising light diffusion film including a diffusion layer including a polydisperse population of light scattering particles of two different average particles sizes 210, 220 in a resin 230.

FIG. 3 depicts a schematic of a plan view of a portion of a surface of an example of an optical film, the depicted surface comprising light diffusion film including a diffusion layer including a monodisperse population of light scattering particles of a single average particle size 310 in a resin 330.

As discussed above, it has been surprisingly found that an optical film in accordance with the present invention can achieve a higher lumen output compared to an optical film having a similar transparent substrate and an optical material including quantum dots, light scattering particles, and a host material, but that does not include a light diffusion film as taught herein. An optical film taught herein also can achieve a higher lumen output compared to a similar optical film having a similar transparent substrate and similar optical material that does not include light scattering particles in the optical material.

Light diffusion films that can be included in an optical film in accordance with the present invention are commercially available.

Examples of suitable commercially available light diffusion films include, but are not limited to, the following light diffusion films available from Kimoto Co. Ltd., Shinjuku Office, 1-5 Yoyogi 2-chome, Shibuya-ku, Tokyo 151-0053 JAPAN: Kimoto Diffusion Film—Light-Up 100NSH, Kimoto Diffusion Film—Light-Up 100MXE, Kimoto Diffusion Film—Light-Up 100SXE, Kimoto Diffusion Film—Light-Up 100LSE, Kimoto Diffusion Film—Light-Up 100GM2, and Kimoto Light Diffusion Film—Chem Mat 125PW. The Kimoto Light Diffusion Film General Specification Sheets for the above-listed Films being hereby incorporated herein by reference in their entireties. Additional information concerning Kimoto Light-Up Films can be found in U.S. Pat. Nos. 5,831,774; 5,852,514; 5,903,391; 6,592,950; 6,602,596; 6,771,335; 7,156,547; 7,244,490; and 7,525,642, which are hereby incorporated herein by reference in their entireties.

Preferably the light diffusion film has barrier properties that slow and more preferably prevent, the diffusion of oxygen and/or moisture through the light diffusion film into an interior portion of the optical film.

Preferably the optical material is encapsulated within the optical film. Encapsulation of the optical material by materials with preselected barrier properties can slow, and more preferably prevent, the diffusion of oxygen and/or moisture into the optical material included in the optical film. For example, the light diffusion film and/or coupling layer and the transparent substrate can fully cover the major surfaces and edges of the optical material included in the optical film, or an edge seal can be further included around the outer perimeter of the optical film or the edge of the optical material within the optical film. Other configurations to encapsulate the optical material can be used.

In the example outlined in FIG. 1, optical material can be deposited as a UV curable ink including quantum dots. In the depicted example, the ink can be printed by techniques known to those familiar in the relevant art, including, but not limited to, screen-printing or stencil printing, slot-die printing, etc. in a predetermined arrangement (e.g., a patterned or unpatterned arrangement on a predetermined area of the transparent substrate. The ink is printed to a predetermined thickness. Such predetermined thickness is selected based on the concentration of quantum dots (e.g., semiconductor nanocrystals) in the ink, the host material (if included) and the intended end-use of the optical film (e.g., the characteristics of light to be supplemented by optical material(s) included in the optical material and the desired color point of the light after passing through the optical film).

In certain embodiments, the ink is printed in air. Printing in air can facilitate ease of manufacture.

In certain embodiments, the ink is printed in a controlled (e.g., air free) environment.

Once printed, the ink is hardened by a mechanism based upon the liquid medium included in the ink. For example, in embodiments in which the liquid component of the ink is a curable resin, the ink is hardened by curing the ink resin. In certain preferred embodiments, the ink resin is UV curable and exposure to a UV light source for a sufficient length of time will cure the ink. For example, an ink including a UV curable acrylic resin can be cured by exposure to a Dymax Fusion H-bulb at, for example, 30-45 milliwatts/cm$^2$ for 20 seconds.

In certain embodiments, the ink hardening step can be carried out in air.

In certain embodiments, the ink is hardened in a controlled (e.g., air free) environment.

Next, a coupling layer is prepared by application of a coupling material or coupling material pre-cursor over the cured optical material. The amount of coupling material or coupling material pre-cursor is preferably at least sufficient to provide a uniform layer of coupling material over the underlying surface including the hardened optical material, having a predetermined thickness. The coupling material or coupling material pre-cursor can alternatively be deposited by other techniques and/or arrangements for attaining a uniform layer over the surface of the substrate including the hardened optical material, having a predetermined thickness The light diffusion film is then disposed over the coupling material or layer of coupling material in a controlled fashion (e.g., that may include a compressive force that is preferably substantially uniform across the film) to join the light diffusion film to the underlying portion of the optical film. The optical film may thereafter be processed to harden or cure the coupling material, and secure the light diffusion film to underlying portion of the optical film.

The present invention will be further clarified by the following examples, which are intended to be exemplary of the present invention.

EXAMPLES

Example 1

Preparation of Semiconductor Nanocrystals Capable of Emitting Green Light

Synthesis of 475 nm CdSe Cores: The following were added to an open-top 1L steel reaction vessel: Cd(Oleate)$_2$ (100.97 g, 1.0 M in TOP), trioctylphosphine oxide (TOPO, 53.2 g), and 1-octadecylphosphonic acid (ODPA, 33.9 g) and 1-octadecene (ODE, 219 g). The vessel was subjected to 3 cycles of vacuum/nitrogen at 120° C., and the temperature was raised to 270° C. under nitrogen. At 270° C., a solution of 1.0 M diisobutylphosphine selenide in N-dodecylpyrrolidone (DIBP-Se, 75.2 g) was rapidly injected, within a period of less than 1 second, followed immediately by injection of ODE (82.5 mL between two syringes) to rapidly drop the temperature to about 224° C. resulting in the production of quantum dots with an initial absorbance peak between 420-430 nm. Immediately after the ODE injection, a solution of Cd(Oleate)$_2$ (237.7 g, 1.0 M in TOP) mixed with ODE (188.5 g) and split into three syringes was continuously introduced along with a solution of DIBP-Se (181.5 g, 1.0 M in NDP) mixed with ODE (226.2 g) and split in to three syringes at a rate of 7.46 mL/min. A total of 49.4 mL of each syringe of precursor was delivered while the temperature of the reactor was maintained between 205-240° C. Energy supply for the mantle is cut at 42 mL infused and mantle removed at 45 mL infused. As the infusion finishes, the reaction vessel was cooled rapidly by immersing the reactor in a squalane bath chilled with liquid nitrogen to rapidly bring the temperature down to <120° C. The final material was used as is without further purification (First absorbance peak: 475 nm, 15 nm Half Width at Half Maximum (HWHM), Total mass: 694.3 g, Reaction yield: 89%).

Synthesis of CdSe/ZnS/CdZnS Core/Shell/Shell: The CdSe core synthesized from above, with a first absorbance peak of 475 nm (33.54 mL, 5.5 mmol Cd), is mixed with dodecanethiol (10.732 g) in a syringe. All Zn(Oleate) precursors (0.5 M in trioctylphosphine) have been doped with 0.85% acetic acid by weight. A reaction flask containing Zn(Oleate)$_2$ (76.314 g, 0.5 M in TOP) and 1-octadecene (ODE, 52.919 g) is heated to 320° C., upon which the syringe containing cores and 1-dodecanethiol is swiftly injected. When the temperature recovers to 300° C. (between 2-8 min), the precursors are delivered via a syringe pump over a period of 40 min. The two precursor stocks consist of the following: 1) Zn(Oleate)$_2$ (170.542 g, 0.5 M in TOP) mixed with Cd(Oleate)$_2$ (52.881 g, 1.0 M in TOP), and 2) dodecanethiol (28.781 g) mixed with trioctylphosphine (TOP, 13.711 g). During the infusion, the temperature was maintained between 320-330° C. Any volatiles from the system were allowed to distill over and leave the system in order for the temperature to reach 320-330° C. After the infusion ended, the sample was annealed for 6 min at 320-330° C. and cooled to room temperature over a period of 5-15 min. The final core/shell material was precipitated via the addition of butanol and methanol at a 2:1 ratio v/v. The pellet was isolated via centrifugation, and redispersed into toluene for storage (Emission 542 nm+/−2 nm, Full Width at Half Maximum (FWHM) 30 nm, Film EQE at RT: 100%, Film EQE at 140 C: >95%).

Example 2

Preparation of Semiconductor Nanocrystals Capable of Emitting Red Light

Synthesis of 577 nm CdSe Cores: The following were added to an open-top 1L steel reaction vessel: Trioctylphosphine oxide (TOPO, 15.42 g), 1-octadecylphosphonic acid (ODPA, 1.88 g) and 1-octadecene (ODE, 225.84 g). The vessel was held under reduced pressure at 100° C. until the material began to reflux, and the temperature was then raised to 270° C. under nitrogen. At 270° C., a solution of 1.0 M diisobutylphosphine selenide in trioctylphosphine (DIBP-Se, 3.93 g) mixed with ODE (10.39 g) and a solution of Cd(Oleate)$_2$ (5.6 g, 1.0 M in TOP) mixed with ODE (13.32 g) was rapidly injected, within a period of less than 1 second, followed immediately by injection of ODE (121 mL) to rapidly drop the temperature resulting in the production of quantum dots with an initial absorbance peak between 420-430 nm. Immediately after the ODE injection, a solution of Cd(Oleate)$_2$ (90.02 g, 1.0 M in TOP) mixed with ODE (71.38 g) and split into three syringes was continuously introduced along with a solution of DIBP-Se (72.84 g, 1.0 M in TOP) mixed with ODE (78.52 g) and split in to three syringes at a rate of varying from 18.6-132 mL/min. A total of 50.01 mL of each syringe of precursor was delivered while the temperature of the reactor was maintained between 235-240° C. As the infusion finishes, the reaction vessel was cooled rapidly by immersing the reactor in a squalane bath chilled with liquid nitrogen to rapidly bring the temperature down to <150° C. The final material was used as is without further purification (First absorbance peak: 577 nm, 12 nm HWHM, Total output: 65.84 mmol, Reaction yield: 107%).

Synthesis of CdSe/ZnS/CdZnS Core/Shell/Shell: A reaction flask containing the CdSe core synthesized from above, with a first absorbance peak of 577 nm (92.3 mL, 8.0 mmol Cd), Zn(Oleate)$_2$ (34.34 g, 0.5 M in TOP) and 1-octadecene (ODE, 51.1 g) is heated to 320° C., upon which the syringe containing 1-dodecanethiol (DDT, 28.97 g) is swiftly injected. When the temperature recovers to 310° C., the precursors are delivered via a syringe pump over a period of 30 min. The two precursor stocks consist of the following: 1) Zn(Oleate)$_2$ (42.02 g, 0.5 M in TOP) mixed with Cd(Oleate)$_2$ (47.19 g, 1.0 M in TOP), and 2) dodecanethiol (23.65 g) mixed with 1-octadecene (ODE, 41.76 g) and trioctylphosphine (TOP, 10.97 g). During the infusion, the temperature was maintained between 320-330° C. Any volatiles from the system were allowed to distill over and leave the system in order for the temperature to reach 320-330° C. After the infusion ended, the sample was annealed for 3 min at 320-330° C. and cooled to room temperature over a period of 5-15 min. The final core/shell material was precipitated via the addition of butanol and methanol at a 2:1 ratio v/v. The pellet was isolated via centrifugation, and redispersed into toluene for storage (Emission 609 nm+/−2 nm, FWHM 20 nm, Film EQE at RT: 97%).

Example 3

Preparation of Semiconductor Nanocrystals Capable of Emitting Green Light

Synthesis of 475 nm CdSe Cores: The following were added to an open-top 1L steel reaction vessel: Cd(Oleate)$_2$ (100.97 g, 1.0 M in TOP), trioctylphosphine oxide (TOPO, 53.2 g), and 1-octadecylphosphonic acid (ODPA, 33.9 g) and 1-octadecene (ODE, 219 g). The vessel was subjected to 3 cycles of vacuum/nitrogen at 120° C., and the temperature was raised to 270° C. under nitrogen. At 270° C., a solution of 1.0 M diisobutylphosphine selenide in N-dodecylpyrrolidone (DIBP-Se, 75.2 g) was rapidly injected, within a period of less than 1 second, followed immediately by injection of ODE (82.5 mL between two syringes) to rapidly drop the temperature to about 224° C. resulting in the production of quantum dots with an initial absorbance peak between 420-430 nm. Immediately after the ODE injection, a solution of Cd(Oleate)$_2$ (237.7 g, 1.0 M in TOP) mixed with ODE (188.5 g) and split into three syringes was continuously introduced along with a solution of DIBP-Se (181.5 g, 1.0 M in NDP) mixed with ODE (226.2 g) and split in to three syringes at a rate of 7.46 mL/min. A total of 49.4 mL of each syringe of precursor was delivered while the temperature of the reactor was maintained between 205-240° C. Energy supply for the mantle is cut at 42 mL infused and mantle removed at 45 mL infused. As the infusion finishes, the reaction vessel was cooled rapidly by immersing the reactor in a squalane bath chilled with liquid nitrogen to rapidly bring the temperature down to <120° C. The final material was used as is without further purification (First absorbance peak: 475 nm, 15 nm HWHM, Total mass: 694.3 g, Reaction yield: 89%).

Synthesis of CdSe/ZnS/CdZnS Core/Shell/Shell: The CdSe core synthesized from above, with a first absorbance peak of 475 nm (39.07 mL, 6.41 mmol Cd), is mixed with dodecanethiol (15.98 g) in a syringe. All Zn(Oleate) precursors (0.5 M in trioctylphosphine) have been doped with 0.85% acetic acid by weight. A reaction flask containing Zn(Oleate)$_2$ (98.8 g, 0.5 M in TOP) is heated to 320° C., upon which the syringe containing cores and 1-dodecanethiol is swiftly injected. When the temperature recovers to 300° C. (between 2-8 min), the precursors are delivered via a syringe pump over a period of 40 min. The two precursor stocks consist of the following: 1) Zn(Oleate)$_2$ (198.68 g, 0.5 M in TOP) mixed with Cd(Oleate)$_2$ (73.26 g, 1.0 M in TOP), and 2) dodecanethiol (33.53 g). During the infusion, the temperature was maintained between 320-330° C. Any volatiles from the system were allowed to distill over and leave the system in order for the temperature to reach 320-330° C. After the infusion ended, the sample was annealed for 6 min at 320-330° C. and cooled to room temperature over a period of 5-15 min. The final core/shell material was precipitated via the addition of butanol and methanol at a 2:1 ratio v/v. The pellet was isolated via centrifugation, and redispersed into toluene for storage (Emission 541 nm+/−2 nm, FWHM 29 nm, Film EQE at RT: 102%, Film EQE at 140 C.: >95%).

Example 4

Preparation of Semiconductor Nanocrystals Capable of Emitting Red Light

Synthesis of 577 nm CdSe Cores (grCdSeC-271): The following were added to an open-top 1L steel reaction vessel: Trioctylphosphine oxide (TOPO, 13.11 g), 1-octadecylphosphonic acid (ODPA, 1.60 g) and 1-octadecene (ODE, 191 mL). The vessel was held under reduced pressure at 100° C. until the material began to reflux, and the temperature was then raised to 270° C. under nitrogen. At 270° C., a solution of 1.0 M diisobutylphosphine selenide in trioctylphosphine (DIBP-Se, 3.34 g) mixed with ODE (8.83 g) and a solution of Cd(Oleate)$_2$ (4.76 g, 1.0 M in TOP) mixed with ODE (11.32 g) was rapidly injected, within a period of less than 1 second, followed immediately by injection of ODE (102 mL) to rapidly drop the temperature resulting in the production of quantum dots with an initial absorbance peak between 420-430 nm. Immediately after the ODE injection, a solution of Cd(Oleate)$_2$ (90.02 g, 1.0 M in TOP) mixed with ODE (71.38 g) and split into three syringes was continuously introduced along with a solution of DIBP-Se (72.84 g, 1.0 M in TOP) mixed with ODE (78.52 g) and split in to three syringes at a rate of varying from 15.8-84.2 mL/min. A total of 45.1 mL of each syringe of precursor was delivered while the temperature of the reactor was maintained between 235-240° C. As the infusion finishes, the reaction vessel was cooled rapidly by immersing the reactor in a squalane bath chilled with liquid nitrogen to rapidly bring the temperature down to <150° C. The final material was used as is without further purification (First absorbance peak: 580 nm, 12 nm HWHM, Total output: 61.81 mmol).

Synthesis of CdSe/ZnS/CdZnS Core/Shell/Shell: A reaction flask containing Zn(Oleate)$_2$ (33.6 g, 0.5 M in TOP) and 1-octadecene (ODE, 219.82 g) is heated to 320° C., upon which the syringe containing the CdSe core synthesized from above, with a first absorbance peak of 580 nm (81.37 mL, 8.0 mmol Cd) and 1-dodecanethiol (DDT, 24.57 g) is swiftly injected. When the temperature recovers to 310° C., the precursors are delivered via a syringe pump over a period of 30 min. The two precursor stocks consist of the following: 1) Zn(Oleate)$_2$ (40.77 g, 0.5 M in TOP) mixed with Cd(Oleate)$_2$ (45.78 g, 1.0 M in TOP), and 2) dodecanethiol (22.98 g). During the infusion, the temperature was maintained between 320-325° C. Any volatiles from the system were allowed to distill over and leave the system in order for the temperature to reach 320-325° C. After the infusion ended, the sample was annealed for 3 min at 320-325° C. and cooled to room temperature over a period of 5-15 min. The final core/shell material was precipitated via the addition of butanol and methanol at a 2:1 ratio v/v. The pellet was isolated via centrifugation, and redispersed into toluene for storage (Emission 609 nm+/−2 nm, FWHM 23 nm, Film EQE at RT: 95%, Film EQE @ 140° C.: >90%).

Example 5

Preparation of Ink Formulation

Ink formulations including green-emitting quantum dots and red-emitting quantum dots were prepared substantially as set forth below.

Example 5A

Ink Formulation Premixes

The following ink formulation (IF) premixes were prepared by adding the identified pre-mix components in the weight percent amounts listed in the Premix Table (below) to a clean, dry Schlenk flask equipped with a magnetic stir bar and rubber septum. The flask was placed in an ultrasonic bath for 10 minutes, and then the contents were stirred and shear-mixed with a rotorstator for 15 minutes.

| PREMIX TABLE | | | | |
|---|---|---|---|---|
| Premix Component | IF Premix 167c Weight % | IF Premix 169a1 Weight % | IF Premix 252a Weight % | IF Premix 252b Weight % |
| Titanium Oxide (R902+, DuPont Corp) | 1.20 | 0 | 0 | 1.20 |
| Fumed Silica (TS-720, Cabot Corp and/or Cab-O-Sil M-5, Cabot Corp) | 10.00 | 6.25 | 6 | 10.00 |
| trioctylphosphine oxide (Sigma-Aldrich) | 5.02 | 0 | 5.32 | 5.02 |
| dodecylphosphate dipotassium salt (PCI) | 0.50 | 0 | 0.53 | 0.50 |
| 1,12-dodecanediol dimethacrylate (Esstech) | 14.13 | 15.92 | 14.98 | 14.13 |
| lauryl methacrylate monomer (LMA) (Sigma-Aldrich) | 68.99 | 77.75 | 75.28 | 68.99 |

Example 5B

Ink Formulation Preparation

Prior to incorporation of the quantum dots into an ink formulation, quantum dots (dispersed in toluene), prepared generally in accordance with one of Examples 1-4, were precipitated from the toluene via the addition of butanol and methanol and isolated via centrifugation. The precipitated quantum dots were then added to and redispersed in lauryl methacrylate (LMA). The concentration (mg/ml) of the QDs in LMA was determined by measuring the optical density at 450 nm and this concentration information was used to determine the volumes of QDs in LMA to add to the ink formulations.

The following ink formulations (IFs) were prepared by adding the identified IF Pre-mix and the quantum dots (in LMA) and additional LMA, in the weight amounts listed in the Ink Formulation Table (below), into a clean, dry Schlenk flask equipped with a magnetic stir bar and rubber septum. The flask was stirred under vacuum for 10 minutes or until the pressure achieved <100 mTorr. The flask was then stirred under nitrogen pressure for 2 minutes and this process was repeated two times. The flask was sealed and brought into a glove box, where the QD Premix was added.

Example 6

QD Film Preparation

For each Ink Formulation to be coated, 2 mL of the Ink Formulation was transferred to an 8 mL vial and 18.3 µL Irgacure 2022 (photoinitiator (PI), BASF) was added. 0.75 mL of the Ink formulation was distributed in a line across a 3.5"×4.0" piece of 2 mil PET film. The formulation was drawn down the length of the PET film with a #50 Mayer rod. The PET film with the coating was placed in a nitrogen-purged chamber inside of a UV flood curing unit (Dymax 5000-EC Series) equipped with a metal halide bulb (Dymax 38560). The box was purged with nitrogen and the sample was cured for 180 seconds.

Example 7

Optical Film Preparation

Optical Film including QD film prepared from IF167C (IF167C includes scatterers in the optical material):
  Ink formulation IF167c was coated onto a transparent PET substrate as generally described in Example 6. The QD film-coated side was mated to a second sheet of 2 mil PET (without adhesive) and fed through the rollers of a benchtop laminator (ChemInstruments Benchtop Laboratory Laminator). A 1"×1" sample was cut from the resulting film stack prior to measurement.

| INK FORMULATION TABLE | | | | |
|---|---|---|---|---|
| Component | IF167c Weight (g) (Premix ID # or QD Example #) | IF169a1 Weight (g) (Premix ID # or QD Example #) | IF252a Weight (g) (Premix ID # or QD Example #) | IF252b Weight (g) (Premix ID # or QD Example #) |
| IF Premix | 86.36 gram (IF Premix 167c) | 4.26 grams (IF Premix 169a1) | 9.2785 grams (IF Premix 252a) | 8.6370 grams (IF Premix 252b) |
| Green-emitting quantum dots in LMA | 0.13 grams QDs [3.83 ml of a 33.46 mg/mL solution of QDs in LMA] (Example 1) | 0.0064 grams QDs [0.1913 mL of a 33.46 mg/mL solution of QDs in LMA] (Example 1) | 0.0155 grams QDs [0.2802 mL of a 55.32 mg/mL solution of QDs in LMA] (Example 3) | 0.0155 grams QDs [0.2802 mL of a 55.32 mg/mL solution of QDs in LMA] (Example 3) |
| Red-emitting quantum dots in LMA | 0.045 grams QDs [0.479 mL of a 93.0 mg/mL solution of QDs in LMA] (Example 2) | 0.0022 grams QDs [0.0239 mL of a 93.0 mg/mL solution of QDs in LMA] (Example 2) | 0.0067 grams QDs [0.0313 mL of a 214.37 mg/mL solution of QDs in LMA] (Example 4) | 0.0067 grams QDs [0.0313 mL of a 214.37 mg/mL solution of QDs in LMA] (Example 4) |
| (LMA) (Sigma-Aldrich) | 11.30 grams | 0.6626 grams | 0.51 grams | 1.24 grams |

Optical Films including QD film prepared from IF169a1 (IF169a1 includes no scatterers in the optical material):

Ink formulation IF169a1 was coated onto a transparent PET substrate as generally described in Example 6, and then laminated against 2 mil PET (without adhesive), as described above.

A piece of a light diffusion film (Kimoto Light-Up 100 SXE (haze (back to front) of 89% and total transmittance (back to front) of 70%)) was attached to the top sheet of 2 mil PET using optical gel (Nye SmartGel OC431A-LVP) with the diffusion layer side facing away from the PET substrate, and a 1"×1" sample was cut from the resulting film stack prior to measurement.

A piece of a light diffusion film (Kimoto Chemical Mat, 75BLB (haze (back to front) of 93% and total transmittance (back to front) of 82%)) was attached to the top sheet of 2 mil PET with the diffusion layer side facing away from the PET substrate, and a 1"×1" sample was cut from the resulting film stack prior to measurement.

Optical Films including QD film prepared from IF252a (IF252a includes no scatterers in the optical material; the optical film includes an optional coupling layer):

Optical Film including a light diffusion film: the QD film-coated side was mated to the adhesive side of a pressure sensitive adhesive (PSA, vendor/part=3M 8172) with one protective layer removed and fed through the rollers of a benchtop laminator (ChemInstruments Benchtop Laboratory Laminator). The second protective layer of the PSA was removed and the film stack was mated to a piece of diffuser film (Kimoto Light-Up 100 SXE (described above) with the diffuse side facing away from the rest of the film stack and fed through the rollers of the laminator. A 1"×1" sample was cut from the resulting film stack prior to measurement.

Optical Film is prepared without a light diffusion film: the QD film-coated side was mated to the adhesive side of a pressure sensitive adhesive (PSA, vendor/part=3M 8172) with one protective layer removed and fed through the rollers of a benchtop laminator (ChemInstruments Benchtop Laboratory Laminator). The second protective layer of the PSA was removed and the film stack was mated to a second piece of 2 mil PET and fed through the rollers of the laminator. A 1"×1" sample was cut from the resulting film stack prior to measurement.

Optical film QD film prepared from IF252b (IF252b includes scatterers in the optical material): the QD film-coated side was mated to the adhesive side of a pressure sensitive adhesive (PSA, vendor/part=3M 8172) with one protective layer removed and fed through the rollers of a benchtop laminator (ChemInstruments Benchtop Laboratory Laminator). The second protective layer of the PSA was removed and the film stack was mated to a second piece of 2 mil PET and fed through the rollers of the laminator. A 1"×1" sample was cut from the resulting film stack prior to measurement.

Example 8

Film Luminance Measurements

Films were tested using an edge-lit configured backlight unit deconstructed from a commercially available 2013 7 inch Kindle Fire HDX from which films included on the light emitting face of the light guide plate of the backlight unit of the commercial product were removed; the opposite face included an enhanced specular reflector.

A test optical film is placed on the light emitting surface of a light guide plate. Crossed brightness enhancing films (BEFs) are positioned over the test optical film, an MPCET mask with a 15 mm square aperture centered in the module is placed over the crossed-BEFS, the aperture being positioned over the position of the test optical film on the light guide place. A metal frame is used to hold the arrangement in place. (BEFs and a mask are included to more closely simulate the conditions inside a typical display backlight unit.) After the test arrangement is assembled, the LED light strip at the edge of light guide plate is driven at 120 milliamps constant current, to illuminate the test optical film/crossed-BEF stack with blue (450 nm) light. The light output from the light-emitting surface of the light guide plate including the test optical film/crossed BEF stack is measured with a Konica Minolta CS-200 Chromameter (a luminance colorimeter (1° measuring angle (~5 mm spot size); 2° observer). Measurements were taken in the dark at room temperature.

Figure 7:
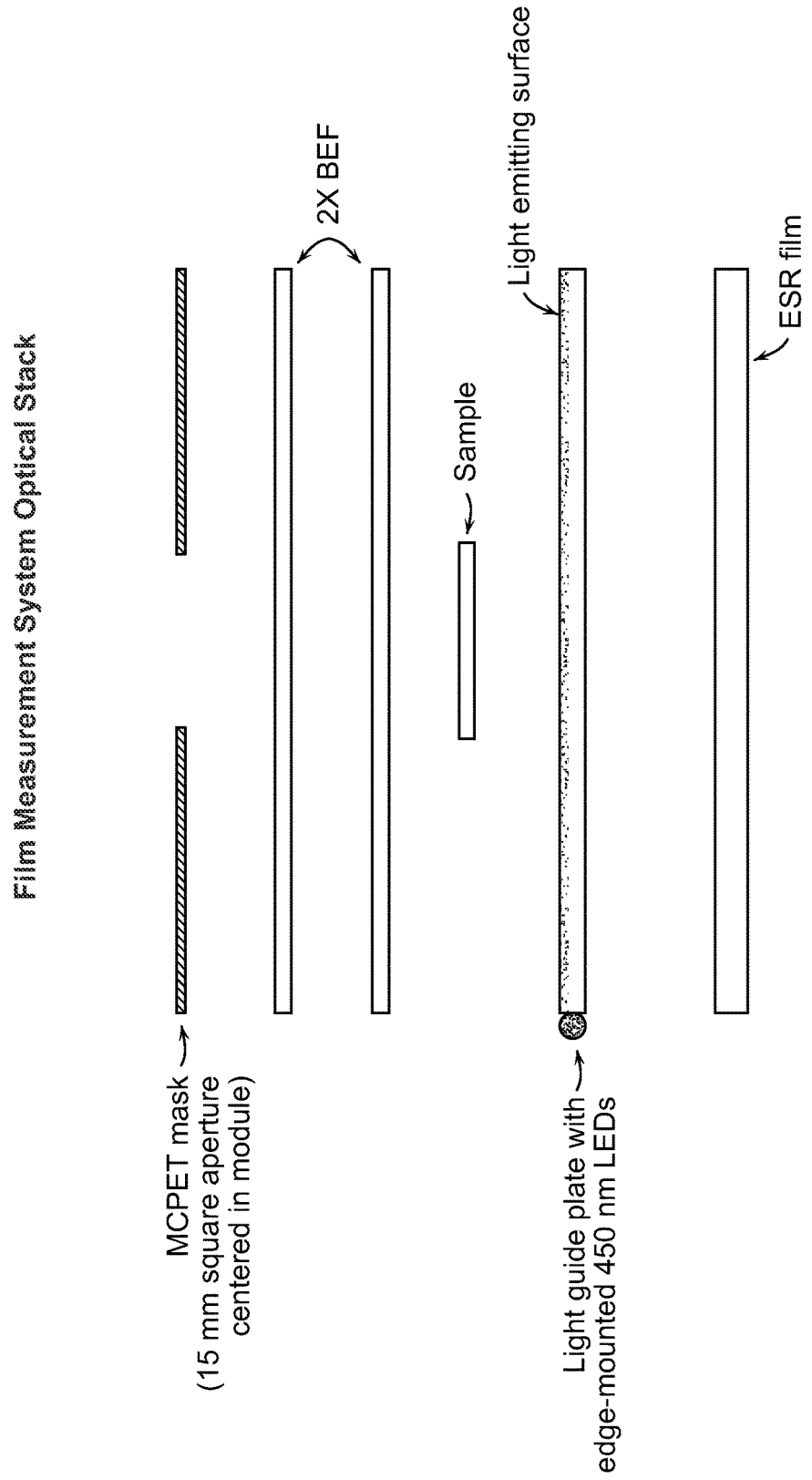
FIG. 7 depicts an exploded view of a schematic representation of an optical stack used in measuring test optical film samples described in the Examples.

FIG. 7 depicts an exploded view of a schematic of the optical stack used in measuring test optical film samples in the backlight testing assembly (also referred to herein as a film measurement system) used. The optical stack includes a test optical film (designated as "Sample" in FIG. 7) and a light guide plate including a light emitting surface. A pair of crossed brightness enhancing films (BEFs) (crossed at a 90 degree angle) are positioned over the test optical film, an MPCET mask including a 15 mm square aperture centered in the module is placed over the crossed-BEFS, the aperture being positioned over the position of the test optical film on the light guide place. A metal frame (not shown) is used to hold the arrangement in place. An ESR (enhanced specular reflector) film is positioned adjacent the surface of the light guide plate opposite the light reflecting surface. FIG. 7 also depicts edge-mounted 450 nm LEDs along an edge of the light guide plate included in the optical stack. While FIG. 7 depicts 450 nm LEDs, LEDS with an emission wavelength in a range from about 445-455 nm can also be useful.

Figure 8:
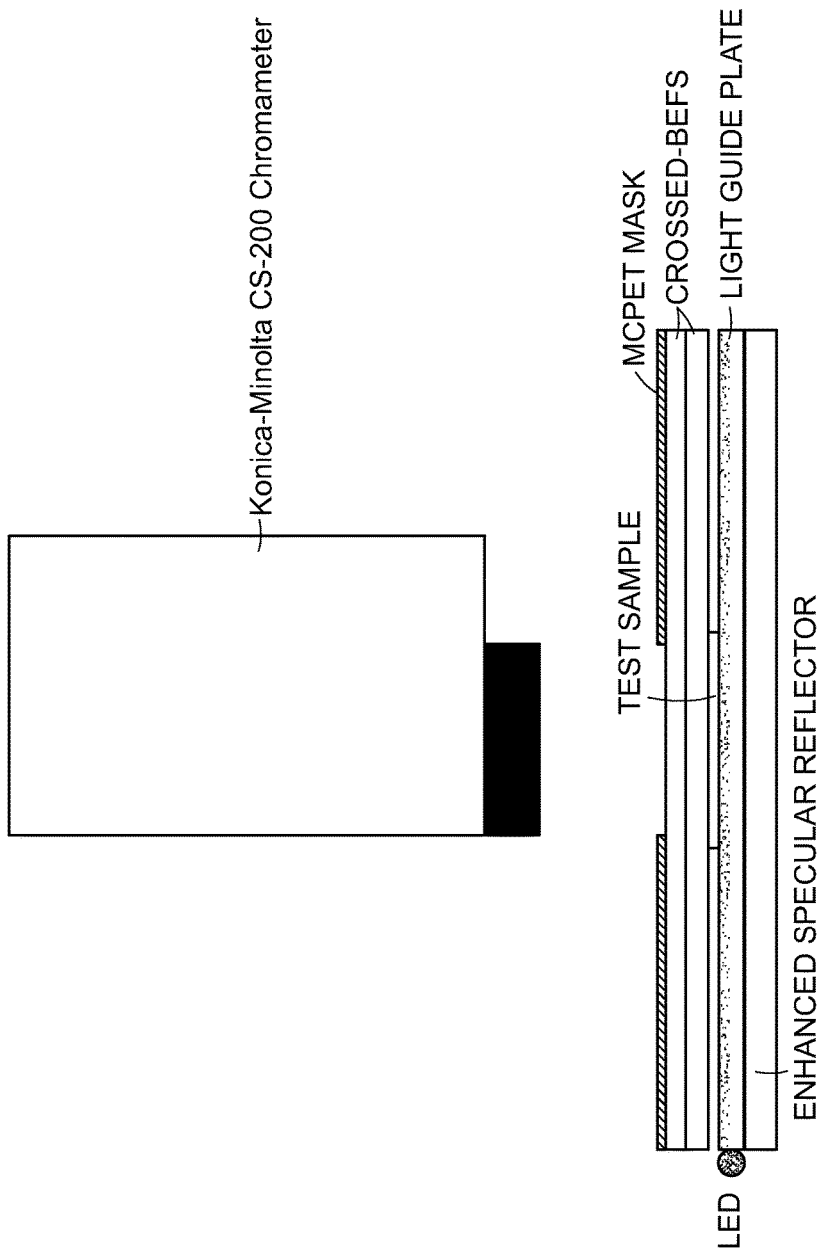
FIG. 8 depicts a schematic representation of the film measurement system referred to in the Examples.

FIG. 8 depicts a schematic backlight testing assembly including a luminance colorimeter (e.g., a Konica Minolta CS-200 Chromameter) positioned over a film measurement optical stack (an exploded view of which is shown in FIG. 7) with edge-mounted 450 nm LEDs positioned along an edge of the light guide plate included in the optical stack.

Figure 9:
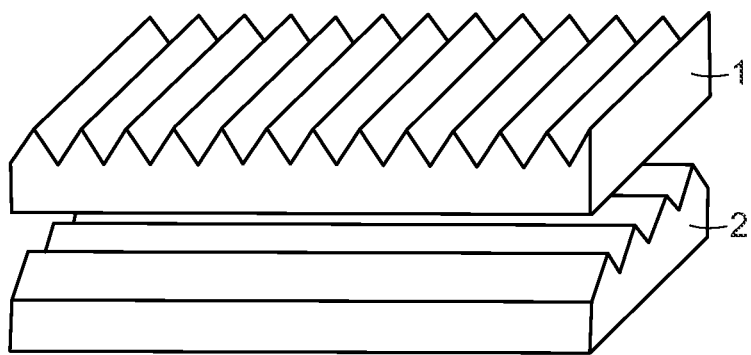
FIG. 9 shows an example of a configuration of crossed-BEFs.

FIG. 9 depicts an example of a crossed arrangement of two BEFs 1, 2 (each depicted with a prism surface).

FIG. 4 and FIG. 5 graphically depict the results of luminance measurements of the test samples.

FIG. 4 shows normalized luminance data measured from test optical films using the film measurement system described above and in FIG. 7 and FIG. 8. The bar labeled 'None' represents normalized luminance data for an optical film that includes no scatters in the optical material and no light diffusion film in the optical film stack measured (including an optical material prepared from Ink formulation IF169a1). The bar labeled "Internal $TiO_2$" represents normalized luminance data for an optical film that includes scatters in the optical material and no light diffusion film in the optical film stack measured (including an optical material prepared from Ink formulation IF167c). The bar labeled "External, Chemical Mat, Kimoto 75BLB" represents normalized luminance data for an optical film that includes no scatters in the optical material and light diffusion film (Kimoto Chemical Mat Diffusion Film 75BLB) in the optical film stack measured (including an optical material prepared from Ink formulation IF169a1). The bar labeled "External, Bead Type, Kimoto 100SXE" represents normalized luminance data for an optical film that includes no scatters in the optical material and light diffusion film (Kimoto Light Up Diffusion Film 100SXE) in the optical film stack measured (including an optical material prepared from Ink formulation IF169a1).

FIG. 5 shows normalized luminance data measured from test optical films using the measurement system described above and in FIG. 7 and FIG. 8. The bar labeled 'None" represents normalized luminance data for an optical film that includes no scatters in the optical material and no light diffusion film in the optical film stack measured (including an optical material prepared from Ink formulation IF252a). The bar labeled "Internal $TiO_2$" represents normalized luminance data for an optical film that includes scatters in the optical material and no light diffusion film in the optical film stack measured (including an optical material prepared from Ink formulation IF252b). The bar labeled "External, Bead Type, Kimoto 100SXE" represents normalized luminance data for an optical film that includes no scatters in the optical material and light diffusion film (Kimoto Light Up Diffusion Film 100SXE) in the optical film stack measured (including an optical material prepared from Ink formulation IF252a) (This latter sample was prepared by lamination and did not include an optical gel.). (The whole film haze for the "None" sample is 4.13%, for the 'Internal, TiO2" sample is 96.20%, and for the "External, Bead Type" sample is 94.48%.)

The cross-BEFs used in the measurement system for measuring the data shown in FIG. 4 and FIG. 5 were the BEFs from the deconstructed Kindle Fire referred to above.

FIG. 6A presents a table of Luminous Efficacy of Radiation (LER) corrected data corresponding to the FIG. 5 test samples. FIG. 6B depicts a graphical representation of the corrected luminance data presented in FIG. 6A.

Figure 10:
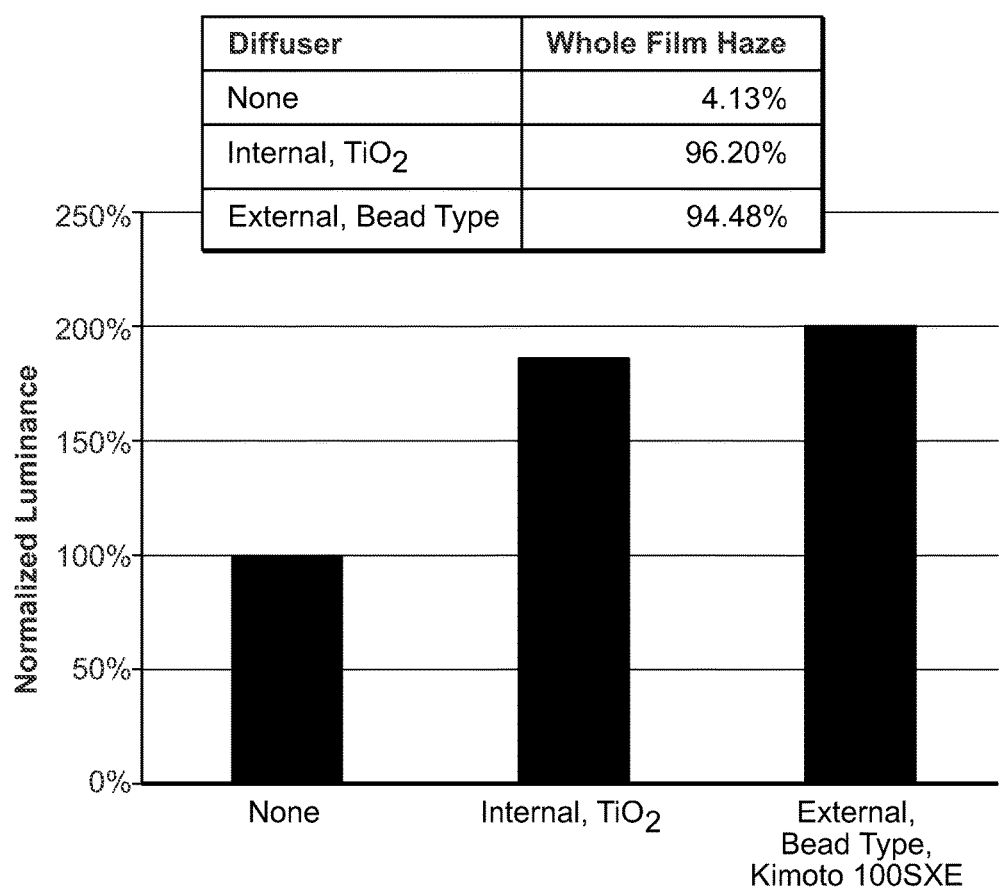
FIG. 10 graphically depicts test data of normalized luminance data measured from certain test optical films described in the Examples, which test optical films include different diffuser types and a test optical film including no diffuser component, and presents a table of the whole film haze values for the tested optical films.

FIG. 10 shows normalized luminance data measured from test optical films using the film measurement system described above and in FIG. 7 and FIG. 8. The bar labeled 'None" represents normalized luminance data for an optical film that includes no scatters in the optical material and no light diffusion film in the optical film stack measured (including an optical material prepared from Ink formulation IF252a). The bar labeled "Internal $TiO_2$" represents normalized luminance data for an optical film that includes scatters in the optical material and no light diffusion film in the optical film stack measured (including an optical material prepared from Ink formulation IF252b). The bar labeled "External, Bead Type, Kimoto 100SXE" represents normalized luminance data for an optical film that includes no scatters in the optical material and light diffusion film (Kimoto Light Up Diffusion Film 100SXE) in the optical film stack measured (including an optical material prepared from Ink formulation IF252a) (This latter sample was prepared by lamination and did not include an optical gel.). FIG. 10 also includes an inset listing the whole film haze value for the tested optical films.

Figure 11:
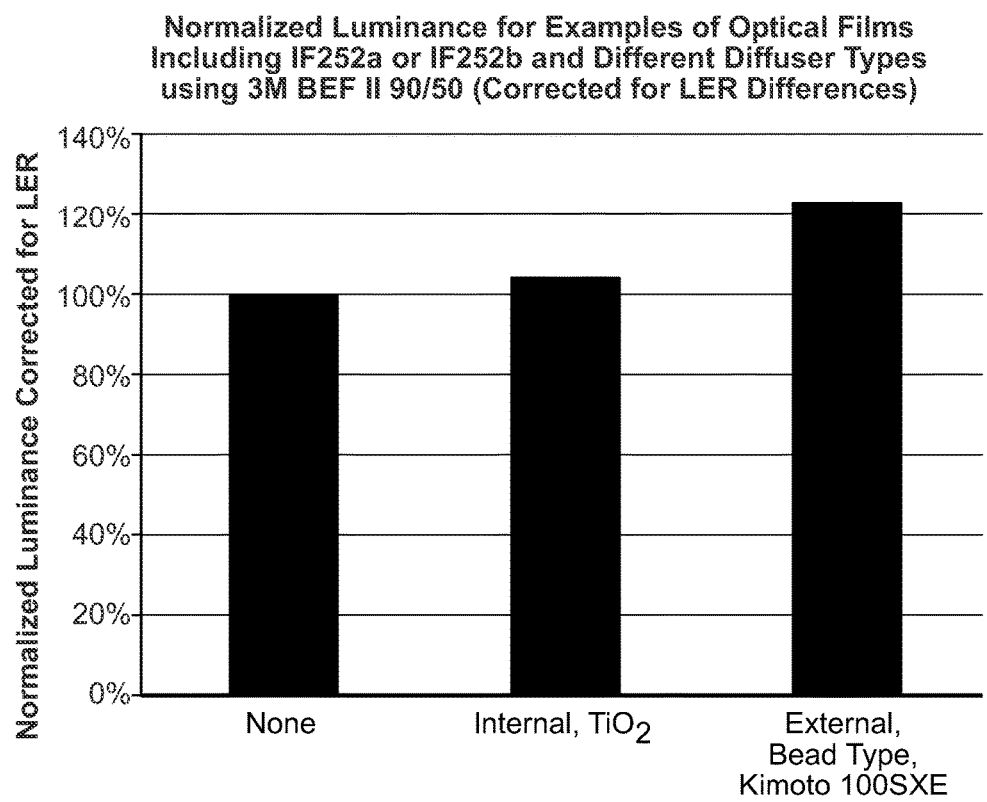
FIG. 11 graphically depicts test data of normalized luminance data measured from certain test optical films described in the Examples, which test optical films include different diffuser types and a test optical film including no diffuser component.

FIG. 11 presents the results from FIG. 10 after Luminous Efficacy of Radiation (LER) correction, and shows 20% increase going from internal scatterers (scatterers included in the optical material) to including a light diffusion film in the optical film with an optical material including quantum dots described herein.

The cross-BEFs used in the measurement system for measuring the data shown in FIG. 10 and FIG. 11 were the two crossed BEFs (3M BEF II 90/50).

In accordance with another aspect of the present invention there is provided a backlight unit including a light guide plate including an optical film taught herein disposed over a first surface of the light guide, and a light source unit including one or more light sources, the optical film or a surface of the light guide plate other than the first surface being positioned to receive light emitted by the light source unit, wherein the one or more light sources emit light of a first wavelength and the quantum dots included in the optical material are selected to convert light of the first wavelength to one or more preselected wavelengths.

In accordance with another aspect of the present invention there is provided a display system comprising a display panel and a backlight unit taught herein configured to provide light to the display panel.

Photoluminescent efficiency can be measured, for example, with use of a spectrophotometer in an integrating sphere including a NIST traceable calibrated light source.

For example, External Quantum Efficiency (EQE) can be measured in a 12" integrating sphere using a NIST traceable calibrated light source, using the method developed by de Mello et al., Advanced Materials 9(3):230 (1997), which is hereby incorporated by reference. The method uses a collimated 450 nm LED source, an integrating sphere and a spectrometer. Three measurements are taken. First, the LED directly illuminates the integrating sphere giving a spectrum labeled L1 and shown in FIG. 3 (which graphically represents emission intensity (a.u.) as a function of wavelength (nm)) for purposes of example in describing this method. Next, the PL sample is placed into the integrating sphere so that only diffuse LED light illuminates the sample giving the (L2+P2) spectrum shown for purposes of example in FIG. 3. Finally, the PL sample is placed into the integrating sphere so that the LED directly illuminates the sample (just off normal incidence) giving the (L3+P3) spectrum shown for purposes of example 4. After collecting the data, each spectral contribution (L's and P's) is computed. L1, L2 and L3 correspond to the sums of the LED spectra for each measurement and P2 and P3 are the sums associated with the PL spectra for 2nd and 3rd measurements. The following equation then gives the external PL quantum efficiency:

$$EQE=[(P3 \cdot L2) \text{minus} (P2 \cdot L3)]/(L1 \cdot (L2 \text{ minus } L3))$$

In certain embodiments, an optical material can further include light scattering particles and other optional additives described herein.

Because semiconductor nanocrystals have narrow emission linewidths, are photoluminescent efficient, and emission wavelength tunable with the size and/or composition of the nanocrystals, they are preferred quantum dots for use in the various aspects and embodiments of the inventions described herein.

The size and composition of quantum dots (including, but not limited to, semiconductor nanocrystals) useful in the various aspects and embodiments of the inventions can be selected such that quantum dots (including, but not limited to, semiconductor nanocrystals) emit photons at a predetermined wavelength of wavelength band in the far-visible, visible, infra-red or other desired portion of the spectrum. For example, the wavelength can be between 300 and 2,500 nm or greater, such as between 300 and 400 nm, between 400 and 700 nm, between 700 and 1100 nm, between 1100 and 2500 nm, or greater than 2500 nm.

Quantum dots (including, but not limited to, semiconductor nanocrystals) are nanometer-scale inorganic semiconductor nanoparticles. Quantum dots (including, but not limited to, semiconductor nanocrystals) include, for example, inorganic crystallites between about 1 nm and about 1000 nm in diameter, preferably between about 2 nm and about 50 nm, more preferably about 1 nm to about 20 nm (such as about 6, 7, 8, 9, 10, 11, 12, 13, 14, 15, 16, 17, 18, 19, or 20 nm).

Semiconductor nanocrystals included in various aspect and embodiments of the inventions most preferably have an average nanocrystal diameter less than about 150 Angstroms (Å). In certain embodiments, semiconductor nanocrystals having an average nanocrystal diameter in a range from about 12 to about 150 Angstroms can be particularly desirable.

However, depending upon the composition and desired emission wavelength of the semiconductor nanocrystal, the average diameter may be outside of these various preferred size ranges.

The semiconductor forming the quantum dots (including, but not limited to, semiconductor nanocrystals) for use in the various aspects and embodiments of the inventions described herein can comprise Group IV elements, Group II-VI compounds, Group II-V compounds, Group III-VI compounds, Group III-V compounds, Group IV-VI compounds, Group I-III-VI compounds, Group II-IV-VI compounds, or Group II-IV-V compounds, for example, CdS, CdO, CdSe, CdTe, ZnS, ZnO, ZnSe, ZnTe, MgTe, GaAs, GaP, GaSb, GaN, HgS, HgO, HgSe, HgTe, InAs, InP, InSb, InN, AlAs, AlP, AlSb, AlS, PbS, PbO, PbSe, Ge, Si, alloys thereof, and/or mixtures thereof, including ternary and quaternary mixtures and/or alloys.

Examples of the shape of the quantum dots (including, but not limited to, semiconductor nanocrystals) include sphere, rod, disk, other shape or mixtures thereof.

In certain preferred aspects and embodiments of the inventions, quantum dots (including, but not limited to, semiconductor nanocrystals) include a "core" of one or more first semiconductor materials, which may include an overcoating or "shell" of a second semiconductor material on at least a portion of a surface of the core. In certain embodiments, the shell surrounds the core. A quantum dot (including, but not limited to, semiconductor nanocrystal) core including a shell on at least a portion of a surface of the core is also referred to as a "core/shell" quantum dot or semiconductor nanocrystal.

For example, a quantum dot (including, but not limited to, semiconductor nanocrystal) can include a core comprising a Group IV element or a compound represented by the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof. Examples of materials suitable for use as a core include, but are not limited to, CdS, CdO, CdSe, CdTe, ZnS, ZnO, ZnSe, ZnTe, MgTe, GaAs, GaP, GaSb, GaN, HgS, HgO, HgSe, HgTe, InAs, InP, InSb, InN, AlAs, AlP, AlSb, AlS, PbS, PbO, PbSe, Ge, Si, alloys thereof, and/or mixtures thereof, including ternary and quaternary mixtures and/or alloys. Examples of materials suitable for use as a shell include, but are not limited to, CdS, CdO, CdSe, CdTe, ZnS, ZnO, ZnSe, ZnTe, MgTe, GaAs, GaP, GaSb, GaN, HgS, HgO, HgSe, HgTe, InAs, InP, InSb, InN, AlAs, AlP, AlSb, AlS, PbS, PbO, PbSe, Ge, Si, alloys thereof, and/or mixtures thereof, including ternary and quaternary mixtures and/or alloys.

In certain embodiments, the surrounding "shell" material can have a bandgap greater than the bandgap of the core material and can be chosen so as to have an atomic spacing close to that of the "core" substrate. In another embodiment, the surrounding shell material can have a bandgap less than the bandgap of the core material. In a further embodiment, the shell and core materials can have the same crystal structure. Shell materials are discussed further below.

Quantum dots are preferably members of a population of semiconductor nanoparticles having a narrow size distribution. More preferably, the quantum dots (including, but not limited to, semiconductor nanocrystals) comprise a monodisperse or substantially monodisperse population of nanoparticles.

Quantum dots show strong quantum confinement effects that can be harnessed in designing bottom-up chemical approaches to create optical properties that are tunable with the size and composition of the quantum dot.

In various aspects and embodiments of the invention, quantum dots (including, but not limited to, semiconductor nanocrystals) optionally have ligands attached thereto.

In certain embodiments, the ligands are derived from the coordinating solvent used during the growth process. The surface can be modified by repeated exposure to an excess of a competing coordinating group to form an overlayer. For example, a dispersion of the capped quantum dot can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the quantum dot, including, for example, phosphines, thiols, amines and phosphates. The quantum dot can be exposed to short chain polymers which exhibit an affinity for the surface and which terminate in a moiety having an affinity for a suspension or dispersion medium. Such affinity improves the stability of the suspension and discourages flocculation of the quantum dot. In other embodiments, quantum dots can alternatively be prepared with use of non-coordinating solvent(s).

Examples of typical coordinating solvents include, but are not limited to, alkyl phosphines, alkyl phosphine oxides, alkyl phosphonic acids, or alkyl phosphinic acids, however, other coordinating solvents, such as pyridines, furans, and amines may also be suitable for the nanocrystal production. Examples of other suitable coordinating solvents include pyridine, tri-n-octyl phosphine (TOP), tri-n-octyl phosphine oxide (TOPO) and tris-hydroxylpropylphosphine (tHPP). Technical grade TOPO can be used. 3,5-di-tert-butyl-4-hydroxybenzylphosphonic acid can also be used as a ligand.

When an electron and hole localize on a quantum dot, emission can occur at an emission wavelength. The emission has a frequency that corresponds to the band gap of the quantum confined semiconductor material. The band gap is a function of the size of the quantum dot. Quantum dots having small diameters can have properties intermediate between molecular and bulk forms of matter. For example, quantum confined semiconductor nanoparticles having small diameters can exhibit quantum confinement of both the electron and hole in all three dimensions, which leads to an increase in the effective band gap of the material with decreasing crystallite size. Consequently, for example, both the optical absorption and emission of semiconductor nanocrystals shift to the blue, or to higher energies, as the size of the crystallites decreases.

The emission from a quantum dot can be a narrow Gaussian emission band that can be tuned through the complete wavelength range of the ultraviolet, visible, or infra-red regions of the spectrum by varying the size of the quantum dot, the composition of the quantum dot, or both. The narrow size distribution of a population of quantum dots can result in emission of light in a narrow spectral range. The population can be monodisperse preferably exhibits less than a 15% rms (root-mean-square) deviation in diameter of the quantum dots, more preferably less than 10%, most preferably less than 5%. Spectral emissions in a narrow range of no greater than about 75 nm, preferably 60 nm, more preferably 40 nm, and most preferably 30 nm full width at half max (FWHM) for quantum dots that emit in the visible can be observed. The breadth of the emission decreases as the dispersity of quantum dot diameters decreases.

For example, quantum dots (including, but not limited to, semiconductor nanocrystals) can have high emission quantum efficiencies such as greater than 10%, 20%, 30%, 40%, 50%, 60%, 70%, 80%, or 90%.

The narrow FWHM of quantum dots (including, but not limited to, semiconductor nanocrystals) can result in saturated color emission. The broadly tunable, saturated color emission over the entire visible spectrum of a single material system is unmatched by any class of organic chromophores (see, for example, Dabbousi et al., J. Phys. Chem. 101, 9463 (1997), which is incorporated by reference in its entirety). A monodisperse population of quantum dots (including, but not limited to, semiconductor nanocrystals) will emit light spanning a narrow range of wavelengths. A pattern including more than one size of quantum dot (including, but not limited to, semiconductor nanocrystals) can emit light in more than one narrow range of wavelengths. The color of emitted light perceived by a viewer can be controlled by selecting appropriate combinations of quantum dot (including, but not limited to, semiconductor nanocrystals) sizes and materials. The degeneracy of the band edge energy levels of quantum dots (including, but not limited to, semiconductor nanocrystals) facilitates capture and radiative recombination of all possible excitons.

Transmission electron microscopy (TEM) can provide information about the size, shape, and distribution of the quantum dots (including, but not limited to, semiconductor nanocrystals) population. Powder X-ray diffraction (XRD) patterns can provide the most complete information regarding the type and quality of the crystal structure of the quantum dots (including, but not limited to, semiconductor nanocrystals). Estimates of size are also possible since particle diameter is inversely related, via the X-ray coherence length, to the peak width. For example, the diameter of the quantum dot (including, but not limited to, semiconductor nanocrystals) can be measured directly by transmission electron microscopy or estimated from X-ray diffraction data using, for example, the Scherrer equation. It also can be estimated from the UV/Vis absorption spectrum.

Quantum dots (including, but not limited to, semiconductor nanocrystals) are preferably handled in a controlled (oxygen-free and moisture-free) environment, preventing the quenching of luminescent efficiency during the fabrication process.

Other materials, techniques, methods, applications, and information that may be useful with the present invention are described in: U.S. Publication No. 20120313075 A1, published 13 Dec. 2012, of Linton, et al., entitled "Optical Component, Products Including Same, and Methods For Making Same"; U.S. Publication No. 20110186811 A1, published 4 Aug. 2011, of Coe-Sullivan, et al., entitled "Optical Components, Systems Including An Optical Component, And Devices"; U.S. Publication No. 20110103064 A1, published 5 May 2011, of Coe-Sullivan, et al., entitled "Solid State Lighting Devices Including Quantum Confined Semiconductor Nanoparticles, An Optical Component For A Solid State Lighting Device, And Methods"; U.S. Publication No. 20110199555 A1, published 18 Aug. 2011, of Coe-Sullivan, et al., entitled "Lighting Systems & Devices Including Same"; U.S. Pat. No. 8,354,785, issued 15 Jan. 2013, entitled "Nanocrystals Including A Group IIIA Element And A Group VA Element, Method, Composition, Device And Other Products" of Clough, et al.; and U.S. Publication No. 20120113671 A1, published 10 May 2012, of Sadasivan, et al., entitled "Quantum Dot Based Lighting", each of the foregoing being hereby incorporated herein by reference in its entirety.

As used herein, the singular forms "a", "an" and "the" include plural unless the context clearly dictates otherwise. Thus, for example, reference to an emissive material includes reference to one or more of such materials.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An optical film comprising:
   a transparent substrate;
   an optical material comprising quantum dots disposed over a surface of the transparent substrate; and
   a light diffusion film disposed over the optical material,
   the light diffusion film comprising a transparent support and a diffusion layer disposed over the transparent support,
   the light diffusion film being positioned such that the transparent support is between the optical material and the diffusion layer, the light diffusion layer defines a light-emitting side of the light diffusion film defining an external light-emitting surface side of the optical film, and
   the light diffusion film having a back to front haze value of at least 90% and a total back to front light transmission value of at least 50%.

2. The optical film in accordance with claim 1, wherein the diffusion layer has an external surface with a matte finish.

3. The optical film in accordance with claim 1, wherein the diffusion layer includes a distribution of light diffusing particles in a transparent resin.

4. The optical in accordance with claim 3, wherein the light diffusing particles have a particle size in a range from about 2 microns to about 30 microns.

5. The optical film in accordance with claim 3 wherein the light diffusing particles are of approximately the same size.

6. The optical film in accordance with claim 3, wherein the light diffusing particles include light diffusing particles of at least two different sizes.

7. The optical film in accordance with claim 6, wherein the at least two different sizes include a first size having an average diameter in a first range from about 2 to about 10 microns and a second size having an average diameter in a second range from about 10 to about 20 microns.

8. The optical film in accordance with claim 1, wherein the optical material is disposed on the surface of the transparent substrate.

9. The optical film in accordance with claim 1, wherein the optical material is disposed as a layer over the surface of the transparent substrate.

10. The optical film in accordance with claim 1, wherein the optical material further comprises a host material in which the quantum dots are distributed.

11. The optical film in accordance with claim 1, wherein the optical material includes quantum dots selected to emit light at one or more preselected wavelengths.

12. The optical film in accordance with claim 8, wherein the optical material includes quantum dots selected to emit light at one or more preselected wavelengths.

13. The optical film in accordance with claim 9, wherein the optical material includes red light-emitting quantum dots and green light-emitting quantum dots.

14. The optical film in accordance with claim 1, wherein the optical material is encapsulated within the optical film.

15. The optical film in accordance with claim 1, wherein the optical film further includes a coupling layer between the optical material and the overlaying light diffusion film.

16. The optical film in accordance with claim 15, wherein the coupling layer comprises an index-matching gel.

17. The optical film in accordance with claim 15, wherein the coupling layer comprises an optically clear adhesive.

18. The optical film in accordance with claim 1, wherein a second transparent substrate is disposed between the optical material and any adjacent layer or film.

19. A backlight unit comprising:
a light guide plate;
the optical film in accordance with claim 1 disposed over a first surface of the light guide plate; and
a light source unit including one or more light sources,
wherein the optical film or a surface of the light guide plate other than the first surface are positioned to receive light emitted by the light source unit, and
wherein the one or more light sources emit light of a first wavelength, and
wherein the quantum dots included in the optical material are selected to convert light of the first wavelength to light of one or more preselected wavelengths.

20. A display system comprising a display panel and the backlight unit in accordance with claim 19 configured to provide light to the display panel.

21. A display system comprising a display panel and a color conversion region comprising the optical film in accordance with claim 1.

* * * * *